US006192350B1

(12) United States Patent
Kies et al.

(10) Patent No.: US 6,192,350 B1
(45) Date of Patent: *Feb. 20, 2001

(54) METHOD OF USAGE-DEPENDENT DETERMINATION OF COSTS IN MAKING COMMUNICATION LINES

(75) Inventors: Eduard Kies, Kaarst; Heinz-Mathias Braun, Dormagen, both of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/083,827

(22) Filed: May 22, 1998

(30) Foreign Application Priority Data

Jun. 4, 1997 (DE) ............................................... 197 23 382

(51) Int. Cl.[7] .................................................... G06F 17/60
(52) U.S. Cl. ............................ 705/400; 705/30; 379/114; 455/405
(58) Field of Search ................................ 705/21, 400, 30, 705/40; 379/114; 455/405

(56) References Cited

U.S. PATENT DOCUMENTS

| | | | |
|---|---|---|---|
| 5,388,211 | * 2/1995 | Hornbuckle | 717/11 |
| 5,497,368 | * 3/1996 | Reijnierse et al. | 370/54 |
| 5,684,861 | * 11/1997 | Lewis et al. | 455/405 |
| 5,717,862 | * 2/1998 | Annapareddy et al. | 395/200.15 |
| 5,884,284 | * 3/1999 | Peters et al. | 705/30 |
| 5,943,657 | * 8/1999 | Freestone et al. | 705/400 |
| 6,029,066 | * 2/2000 | Despres et al. | 455/419 |

FOREIGN PATENT DOCUMENTS

08315009 * 11/1996 (JP) .

OTHER PUBLICATIONS

Liebmann; ISDN Unplugged (ISDN's simultaneous voice, data, image and video transmission over one line is attactive; its confusing pricing and poor mktg are not); Apr. 1996; Information Week, n576, p65; DialogWeb copy pp. 1–5.*

Mishkoff; Billing Systems; Nov. 1992; Cellular Business v9n12 pp24–30, 88; DialogWeb copy pp. 1–12.*

Kruse; Maximizing Profit with Airtime Billing; Mar. 1992; Communications v29n3 pp 73–76; DialogWeb copy pp. 1–6.*

Wexler; New Options in Telephones; Feb. 1991; D&B Reports v39n1 pp 56–57; DialogWeb copy pp. 1–5.* no author; Long–Distance Price Cuts: AT&T Plan Cuts Some International Business Calls 30 Percent; Feb. 1992; Edge, on&about AT&T, v7n186, p N/A; DialogWeb copy pp. 1–2.*

Minoli; Interconnecting Local Area Networks Over a Wide Area: Switched Solutions; Feb. 1991; Network Computing p81; DialogWeb copy pp. 1–5.*

* cited by examiner

Primary Examiner—Edward R. Cosimano
Assistant Examiner—Thomas A. Dixon
(74) Attorney, Agent, or Firm—Michael J. Striker

(57) ABSTRACT

The process for usage-dependent determination of costs in making communication links between at least three communication facilities (12) of a group or network (10), which are connected with each other by usage-independent fixed lines, includes assigning a link logical record to each communication link made between the communication facilities (12) and evaluating each link logical record according to usage for usage-dependent determination of costs, so that individual user costs may be reduced according to usage. The link logical record includes all information clearly defining the link including user information and communication path information consisting of a sequence of code numbers describing the sequence in which the other communication facilities are connected when the link is made as the path information. The link logical record is advantageously stored and evaluated in the initiating communication facility according to usage by the users for a usage-dependent determination of communication costs to be allocated to the users. The communication costs of the users are changed according to the extent of the usage by the users.

11 Claims, 1 Drawing Sheet

| | 8 | 7 | 6 | 5 | 4 | 3 | 2 | 1 | |
|---|---|---|---|---|---|---|---|---|---|
| LENGTH | 0 | 0 | 0 | 0 | 0 | 1 | 1 | 0 | 06H |
| Byte 1 | 0 | 0 | 0 | 0 | 0 | 0 | 1 | 1 | 03H |
| Byte 2 | 0 | 0 | 0 | 0 | 1 | 0 | 0 | 1 | 09H |
| Byte 3 | 0 | 0 | 0 | 0 | 0 | 1 | 1 | 1 | 07H |
| Byte 4 | 1 | 0 | 0 | 0 | 0 | 0 | 1 | 0 | 82H |
| Byte 5 | 0 | 0 | 0 | 0 | 1 | 0 | 0 | 1 | 09H |
| Byte 6 | 1 | 1 | 0 | 0 | 0 | 1 | 0 | 1 | C5H |

METHOD OF USAGE-DEPENDENT DETERMINATION OF COSTS IN MAKING COMMUNICATION LINES

BACKGROUND OF THE INVENTION

The present invention relates to a method for usage-dependent determination of costs in making communication links, in which respective usage-independent fixed lines are connected between a plurality of communication facilities.

It is known to rent fixed lines of an operating network between communication facilities belonging to a group. These fixed lines are available independently of usage and are correspondingly added to the total costs. In order to reduce the costs of the user of the communication facilities of the group, the total cost is reduced in known ways, for example, according to the size of a user associated with the communication facility or other suitable criteria. In any case the current cost reductions are made in a manner which does not depend on usage so that an actual cost distribution based on actual usage is not possible.

SUMMARY OF THE INVENTION

It is an object of the present invention to provide an improved method for usage-dependent determination of costs in making communication links which does not have the above-described disadvantage.

According to the invention, the process for usage-dependent determination of costs in making communication links, in which at least one usage-independent fixed line is connected between a plurality of communication facilities, includes assigning a link logical record to each communication link made between the communication facilities, this link logical record including all information defining the communication link to which the link logical record is assigned, and evaluating each link logical record according to usage.

The method according to the invention has the advantage that the total costs to the user of the communication facilities arising for making the links or connections can be reduced according to the amount of usage. Because every link between the communication facilities is associated with a link logical record, which contains all information, advantageously user information and facility connection path information, clearly defining the link, the link logical record can be fed to an evaluating device associated with the originating communication facility which evaluates the exact parameters of the link for an additional evaluation, especially for determining costs connected with the link. Very advantageously information regarding a user initiating the connection, a user being connected to and the connection path and link duration determining the cost can be obtained from the link logical record. If the link logical record is stored according to costs, a later reduction of the total costs according to usage may be possible.

Various preferred embodiments are based on the above-described generic inventive concept. In one preferred embodiment the evaluation means for evaluating link logical records is provided in each communication facility and the link logical records associated with an originating communication facility initiating the communication link are fed to the evaluation means. The evaluation means are permanently connected with each communication facility by means of an interface.

In a particularly preferred embodiment of the method of the invention a code number, preferably an alphanumeric entity, is assigned to each communication facility and is used in the formulation of the respective path information for the communication links, and the code numbers of all communication facilities connected with each other when a communication link is made are transmitted to the originating communication facility initiating the communication link. Advantageously the code numbers of all communication facilities connected with each other when the communication link is made are transmitted in a reverse order to the originating communication facility, this reverse order being opposite to an order in which connections between communication facilities are made during establishment of the communication link.

Path information is advantageously transmitted between communication facilities over the fixed lines by transmitting a byte sequence. The code numbers of the communications facilities connected with each other to make a communication link are encoded in bits 1 to 4 of respective bytes to form the byte sequence for the path information. A bit 8 is set in the last place of a code number of a last connected communication facility connected in a communication link as a final character for the communication link. A bit 7 is set in the last place of a code number of a last connected communication facility of a connected group when the transmitted path information is incomplete.

In preferred embodiments the method according to the invention is applied to networks including at least three communication facilities or devices and is particularly advantageous when many, e.g. six, communication facilities are connected in a network with fixed lines.

BRIEF DESCRIPTION OF THE DRAWING

The objects, features and advantages of the invention will now be illustrated in more detail with the aid of the following description of preferred embodiments, with reference to the accompanying figures in which.

DESCRIPTION OF THE PREFERRED EMBODIMENTS

Figures 1, 2:
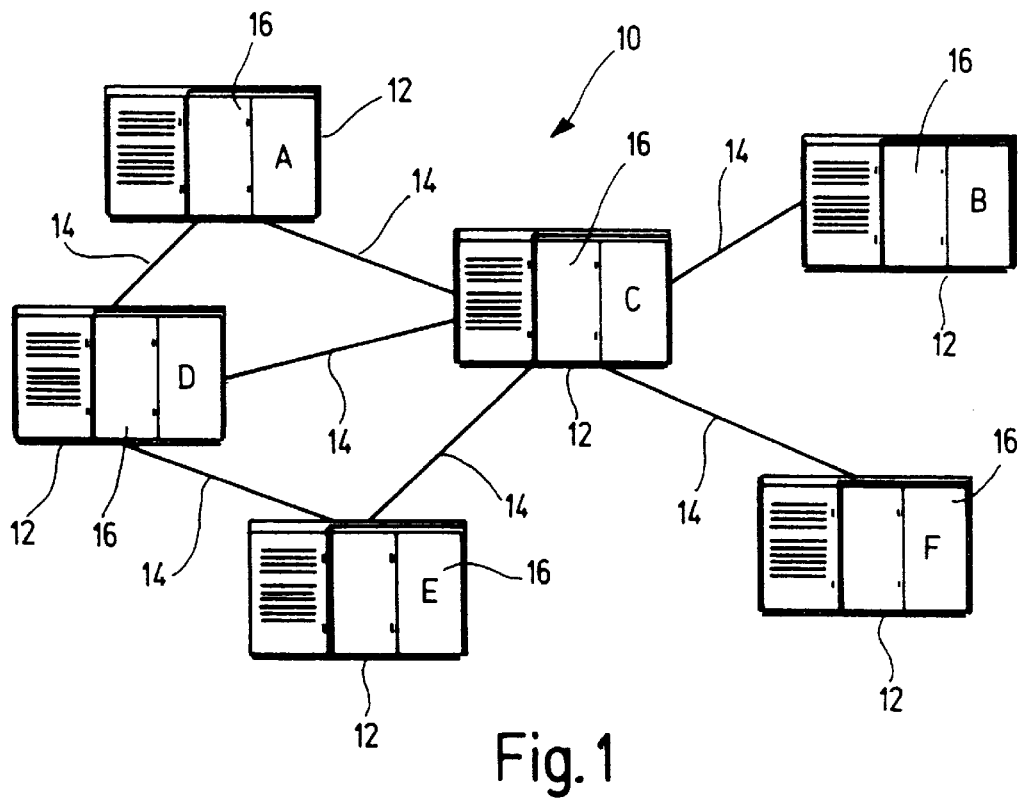
FIG. 1 is a schematic overview of a group of communication facilities connected in a network by fixed lines.
FIG. 2 is a portion of a link logical record for the method according to the invention.

A group 10 of individual communication facilities 12 is shown in FIG. 1. The individual communication facilities 12 are indicated with A, B, C, D, E and F. The communication facilities 12 are connected with each other with fixed lines 14. Here either linear links or connections, for example directly between the communication facilities B and C or F and C, are possible or communication facilities 12 are networked with each other, for example the communication facilities A, C, D and E.

The group 10 of the communication facilities 12 can, e.g., be a network used by a large business located at several permanent sites. On the other hand, the group 10, for example, can be used jointly by several businesses, the individual businesses being associated with respective communication facilities 12.

Each communication facility 12 has a certain number of users. Each communication facility 12 can have ten, fifteen, twenty or several hundred users according to its size and structure. This is clearly the situation when the communication facility 12 can be considered as a central exchange or switching center, to which a number of subscribers or extensions are connected by means of an internal distribution network.

The communication facilities 12 each have an analysis or processing unit 16, which is either integrated in the communication facility 12 or is permanently connected with it by an interface. The evaluating or processing unit 16, which is not illustrated in detail here can have microprocessor units, memory units and the required peripheral devices necessary for evaluation or analysis, for example printers, display screens and the like.

A link logical record is transmitted to the evaluating unit 16 for each direct communication link made over at least one of the fixed lines. This link logical record contains all the required information which clearly defines the link which is made. The link logical record can, for example, include the number of the calling party, the number of the called party, an internal fixed accounting center of the calling party, an identification number for the fixed line used, the type of link made, for example, direct call, call rerouting, additional link, etc., link data, such as duration of link and information path flow over the fixed line 14. With the aid of this link logical record a definite assignment of a guided link is possible, so that costs for operation of the fixed lines 14 and, if necessary, the operation of the evaluating or processing unit 16 can be reduced regarding usage. Thus it is possible to divide the actually occurring costs among the actual users so that total bill reductions due to incorrect cost distributions do not occur.

The link logical record is transmitted to the communication facility 12 which initiates the link. For further dial switching, call rerouting or other services of an already formed link the link logical record is assigned to the subscriber of the initiating communication facility 12 or to the subscriber of the switching communication facility. The user of the switching communication facility 12 would incur the costs or partial costs for this latter link.

The individual information about the communication facilities 12 for the link logical record is retrieved in a simple manner. Subsequently the path information, especially regarding the available reception locations, should be included in the link logical record, since the path information is an important criterion for actual usage of one or more fixed lines 14, which is not disclosed to the user of the link.

Each communication facility 12 is assigned a predetermined code number in the group 10 for identification of the actually used connection path over the fixed lines 14. The code number of the communication facility 12 can either be established internally within the group 10 or a predetermined code number from the maker of the communication facility 12 can be used. The code numbers are preferably alphanumeric and can have a different position number according to the size of the communication facility or the subscribers or exchanges connected to it.

The identification of the connection path is made by transmission of the code numbers of the communication facilities 12 selected or used in the transmission to the originating communication facility 12, which means it is fed back to the communication facility 12 from which the link originates and stored there in the evaluating or processing unit 16 as part of the information in the link logical record or further processed.

The manner in which the path information is provided is now illustrated in greater detail with the aid of a concrete example in the following.

The communication facilities 12 are assigned, e.g., the following code numbers: device A, 114; device B, 53; device C, 3972; device D, 95; device E, 68245; and device F, 37.

In order to obtain a uniform information record length, the code numbers of the communication facilities 12 are filled to a number of digits or places determined by the largest code number during their transmission at the preceding communication facility 12 in the connection path of an individual link. The code numbers of the communication facilities 12, whose number of places are smaller than the number of places of the largest code number of one of the communication facilities 12 inside a connection path are filled with initial values.

If a user of the communication facility A makes a link to a user of the communication facility F, the communication facility 12 of the unit A selects the best connection path. The best connection or communication path is not necessarily the shortest, in the named example, for example, to communication facility F via the communication facility C, but arranges itself according to the load on the individual fixed lines 14 at the time of making the link. In a concrete example the linking of the communication facility A to communication facility F occurs by means of the communication facilities D, E, C to F. When the connection with the called subscriber of the communication facility F occurs, the communication facility C is fed back a path signal from the communication facility F, which, in turn, is fed back from the communication device C to the facility E, and from there to the facility D and finally from the facility D to the communication facility A. Each communication facility 12 present in the communication chain receives the path signals from the preceding communication facility and complements it with its own communication path signal.

This communication path information contains the code numbers of the concerned communication facilities 12, which necessarily are filed with the initial values. In the embodiment described here this path information is checked as described in the following paragraphs.

The communication facility C obtains path information from the communication facility F in the form of its code number, thus 37. The communication facility E receives then the path information from the communication facility C, which includes the code number of the communication facility C and the communication facility F. Since the code number of the communication facility F is two places and the code number of the communication facility C is four places the code number of the communication facility F is filled with two initial values, for example −1. The communication facility E thus receives the path information 37-1-1,3972. In an analogous manner the communication facility D receives path information of the preceding communication facilities involved in the link. After that it reads: 37-1-1-1,3927-1,68245. Since the code number of the communication facility E is five places, the code numbers of the preceding communication facilities C, F are filled with suitable number of initial values −1 to five places. The communication facility A subsequently receives the entire path information. After that it reads: 37-1-1-1, 3972-1, 68245, 95-1-1-1. With this path information which is included in the link data record as part of the information in it, the path of the link over the individual fixed lines can be clearly completely determined afterward, so that a distribution of costs can be made according to the additional information in the link data record, such as, link duration, link data, cost center, and so forth.

The retransmission of this path information over the fixed lines is illustrated with the help of the table in FIG. 2. The path information can be supplied as a byte sequence, which contains the individual information entities encoded in a suitable hexadecimal code. A simplified example is provided in which a link is made between the communication facilities A and C by means of the communication facility D. The communication facility C has the code number 3972 and the communication facility has the code number 95.

Certain prerequisites are established for the transmission of the path information. The entire length of the path information is transmitted in the first line of the byte sequence. In the indicated example the total length is six, which includes the four place code number for the communication facility C and the two place code number for the communication facility D. Subsequently the code number of the communication device are transmitted in individual byte sequences, wherein, as already mentioned, beginning with the last communication facility 12, the present one always adds its code number. In the example the code number of the communication facility C is thus transmitted next. The individual digits of the code numbers are transmitted as respective bytes, whereby the bits 1 to 4 are used for the respective bytes. In the example the "3" is transmitted in byte 1, the "9" in byte 2, the "7" in byte 3 and the "2" in byte 4 for the code number 3972. Since after the "2" the code number of the communication facility 12 is finished, in the byte corresponding to the last digit, here also the byte "4", the bit "8" is allocated so that it is clear to the subsequent evaluating device, that the code number for the communication facility 12 ends here. The code number for the communication facility D is added after that in an analogous manner. The "9" is located in byte 5 and the "5" in byte 6 in the path information. Since the communication facility D has a two-place code number, the bit 8 is allocated to the byte 6, so that it is clear that the path information of the communication facility D ends here.

The setting of the overflow flag, also the bit 7, thus operates to limit the length of an information path to a required or desired size. If for example the total information path should have a maximum of 10 or 20 bytes, after the respective last byte is obtained the bit 7 is set as overflow flag, so that additional information can no longer be added. Thus it is possible to limit the required storage locations in the individual analysis or evaluation unit 16 of the communication facility 12.

The bit 7 is only set in the last byte when the path information is incomplete. If the path information is completely transmitted, thus the bit 7 in the last byte is always 0. The hint that the entire path information has been transmitted is determined from the first byte "length".

The disclosure in German Patent Application 197 23 382.1 of Jun. 4, 1997 is incorporated here by reference. This German Patent Application describes the invention described hereinabove and claimed in the claims appended hereininbelow and provides the basis for a claim of priority for the instant invention under 35 U.S.C. 119.

While the invention has been illustrated and described as embodied in a method of usage-dependent determination of costs in making communication links, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A process for usage-dependent determination of costs after making communication links between at least three communication facilities (12), said at least three communication facilities (12) being connected to each other by a plurality of usage-independent fixed lines (14) for the communication links, said process comprising:
   a) assigning a respective code number to each of said communication facilities to identify each of said communication facilities;
   b) transmitting said code numbers of all of said communications facilities connected with each other when each of said communication links is made to an originating one of said communications facilities;
   c) assigning a respective link logical record to each of the communication links made between the at least three communication facilities (12), said link logical record including user information including initiating user, connected user and link duration and path information defining said communication link to which said respective link logical record is assigned, said path information including said code numbers indicating which of said communication facilities (12) are connected with each other;
   d) evaluating said link logical records in said originating communication facility to determine an amount of usage by said users in order to make a usage-dependent determination of communication costs of said users; and
   e) after evaluating according to step d), modifying said communication costs of said users according to said amount of said usage.

2. The process as defined in claim 1, further comprising providing evaluation means (16) for evaluating said link logical records and feeding said link logical record associated with an originating one of said communication facilities (12) initiating one of said communication links to said evaluation means.

3. The process as defined in claim 2, wherein said evaluating means (16) is permanently connected with each of said communication facilities (12) by means of an interface.

4. The process as defined in claim 1, wherein said code numbers of all of said communication facilities connected with each other when said communication link is made are transmitted in a reverse order to the originating communication facility, said reverse order being opposite to an order in which connections between said communication facilities are made during the establishment of said communication link.

5. The process as defined in claim 1, wherein said code numbers are alphanumeric.

6. The process as defined in claim 1, further comprising adding initial values to said code numbers of said communication facilities connected with each other during a single communication link which have a smaller number of places than a code number of said communication facilities associated with said single communication link having a largest number of places so that all of said code numbers associated with said single communication link have an equal number of places.

7. The process as defined in claim 1, further comprising transmitting a byte sequence over said fixed lines to transmit said path information.

8. The process as defined in claim 7, further comprising encoding the code numbers of each of said communications facilities connected with each other to make said one of said communication links in bits 1 to 4 of respective bytes of said byte sequence.

9. The process as defined in claim 8, further comprising setting a bit 8 in a last place of the code number of a last connected one of the communication facilities connected in said one of said communication links as a final character.

10. The process as defined in claim 8, further comprising setting a bit 7 in a last place of a last connected one of said communication facilities of a connected group of said communication facilities when said path information which is transmitted is incomplete.

11. The process as defined in claim 1, wherein said at least three communication facilities consists of six of said communication facilities.

* * * * *